United States Patent

Ono et al.

[11] Patent Number: 6,049,439
[45] Date of Patent: Apr. 11, 2000

[54] DATA ERROR RECOVERY USING REDUCED SPEED

[75] Inventors: Hiroyuki Ono, Fujisawa; Tetsuo Ueda, Sagamihara; Kazushige Okutsu, Fujisawa, all of Japan

[73] Assignee: International Business Machines Corporation, Armonk, N.Y.

[21] Appl. No.: 08/982,737

[22] Filed: Dec. 2, 1997

[30] Foreign Application Priority Data

Mar. 12, 1996 [JP] Japan .................................... 8-322671

[51] Int. Cl.$^7$ ............................... G11B 5/09; G11B 15/46
[52] U.S. Cl. ........................... 360/53; 360/73.03; 360/46
[58] Field of Search ................................ 360/25, 53, 46, 360/65, 51, 73.03; 369/53, 59

[56] References Cited

U.S. PATENT DOCUMENTS

| 5,233,482 | 8/1993 | Galbraith et al. | 360/32 |
| 5,416,646 | 5/1995 | Shirai | 360/53 |
| 5,544,138 | 8/1996 | Bajorek et al. | 369/53 |
| 5,754,355 | 5/1998 | Nakamura et al. | 360/73.03 |

*Primary Examiner*—W. Chris Kim
*Attorney, Agent, or Firm*—G. Marlin Knight

[57] ABSTRACT

A method and apparatus for improving the data readability in a disk drive is described. The disk drive uses an error recovery mode in which the rotational speed of the motor is decreased below the normal operating speed and a rereading is performed. The reduced speed lowers the energy generated in collisions with a foreign object and the data error length is shortened allowing data to be read which cannot be read at the normal operating speed.

20 Claims, 3 Drawing Sheets

US 6,049,439

DATA ERROR RECOVERY USING REDUCED SPEED

FIELD OF THE INVENTION

The present invention is related to error recovery in a storage device.

DESCRIPTION OF RELATED ART

A disk drive is an apparatus for recording data on the disk surface and reading it. A head having a signal transducer is positioned at a desired location on a track in which data is recorded and data is read or written. The measures to recover an error having occurred during a data reading or writing by the head include an error recovery procedure (ERP) including various error recovery steps.

On a disk, a read error may be caused by various sources such as a flaw, unevenness of the magnetic material, or change with time in the magnetic material. Generally, for errors in the data portion an error correction code (ECC) is used. Furthermore, in the error recovery mode various recovery procedures are executed such as changing the read gain, change of off-track error, change of the bias value for an MR (magnetoresistive) element if an MR element is used as the read head. If the error cannot be recovered even by a plurality of error recovery procedures, it is determined to be a hard error, or if the data can be re-recorded (reassigned) in another area, the corresponding area on the disk is made to be unusable and the re-recording of the data to another area is carried out.

In many of the current disk drives, a magnetoresistive (MR) transducer head is used. This utilizes a very small resistance change due to a change in magnetic field. By causing a direct current to flow in the MR head, the resistance change is converted to a voltage signal to perform data reading.

However, in the method in which a resistance change is read, a read error due to thermal asperity may occur. The thermal asperity means that a protrusion or deposit produced on a disk collides with the read head to cause a resistance change due to a temperature change in the MR element, whereby an abnormal signal is generated.

The conventional measures against the read error due to thermal asperity include error recovery steps such as a low rotational speed burnish and a high rotational speed reading. The low rotational speed burnish is to reduce the flying height and radially move the head in the vicinity of a target track, thereby to flick away the foreign objects on the disk which may cause thermal asperity. The high rotational speed reading is to increase the flying height for preventing the head from bumping against foreign objects, and perform a data reading.

None of these background arts has a function decreasing the rotational speed of the motor to read data.

SUMMARY OF THE INVENTION

It is an object of the present invention to provide a method and apparatus for improving the data readability in a disk drive.

Further, it is an object of the present invention to provide an error recovery method and mode for a data storage apparatus effective for recovering from certain read errors, such as those due to thermal asperity.

The error recovery method in a disk storage device according to the present invention is to reread the data at a lower rotational speed which decreases the effect of certain causes of errors. For example, by decreasing the rotational speed of the motor, the energy generated by the collision of the head with foreign objects is reduced and the data error length is shortened. The channel parameters for reading data and the servo gain may need to be adjusted to match the lower speed. The reduced speed is preferably 0.4 to 0.7 of the normal operating speed.

DESCRIPTION OF PREFERRED EMBODIMENTS

Figure 1:
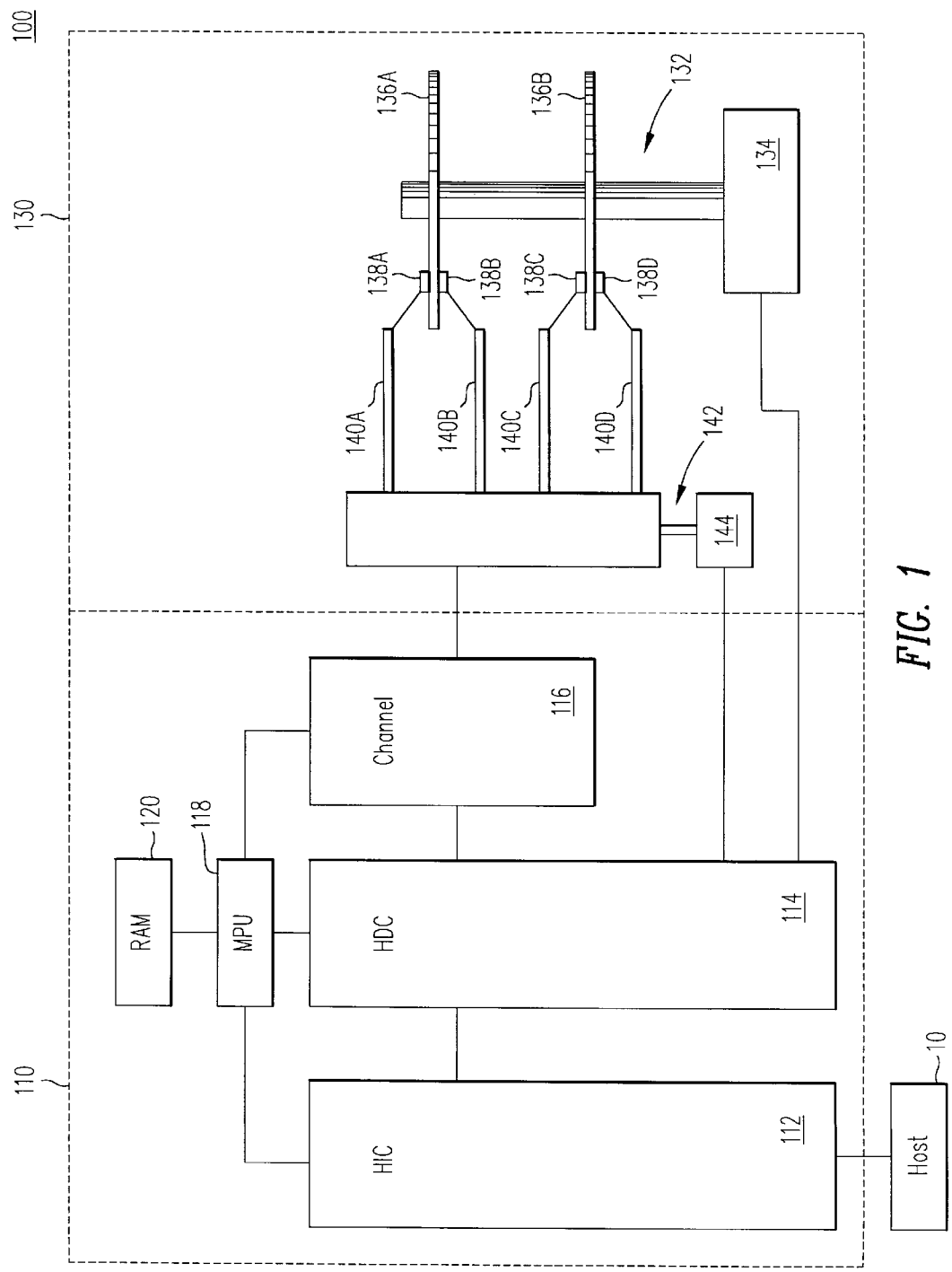
FIG. 1 is a block diagram of the hard disk drive (HDD) to which the present invention is applied.

FIG. 1 is a block diagram of the hard disk drive (HDD) to which the present invention is applied. A disk drive 100 consists of a controller unit 110 and a disk unit 130. The controller unit 110 comprises a host interface controller (HIC) 112 connected to a host system 10, a hard disk controller (HDC) 114 connected to the host interface controller 112 for controlling the disk unit, a channel 116 connected to the hard disk controller 114 for controlling read and write signals, an MPU 118 connected to the HIC 112, HDC 114 and channel 116 for controlling them, and a RAM 120 connected to the MPU 118 for storing a microcode executed by the MPU. The disk unit 130 includes a motor 134 for rotating a spindle 132. To the spindle 132, disks 136A and 136B are attached so as to rotate integrally with the spindle 132. Although two disks are shown in the figure, they may be one, or three or more.

Heads 138A, 138B, 138C, and 138D are supported by actuator arms 140A, 140B, 140C, and 140D so as to face the disk surfaces, respectively. The actuator arms 140A through 140D are attached to a voice coil motor (VCM) 144 through a pivot shaft 142, and by the rotation of the VCM 144, the heads 138A to 138D are moved to a desired radial position. The motor 134 and the VCM 144 are connected to the HDC 114 which controls the respective rotational speed, actuator speed and the like. The heads 138A through 138D are connected to the channel 116, and the read and write signals are controlled by the channel 116.

Generally, on the magnetic disk of a hard disk or the like, data tracks are formed in concentric circles. The reading or writing of information to the disk is performed after moving the head substantially along the radial direction of the disk to position it at a specific data track while rotating the disk. The positioning of the head at a specific data track is performed by the servo system reading position identifying information prestored on the disk.

After the positioning of the head at a desired track, a data reading or writing operation is carried out. In this operation, the failure of reading or writing of accurate data, or an error, may occur. Many of the errors occurring on the disk are caused by missing data. The missing data is often caused by disk surface flaws generated with time, damages of the magnetic material due to a change with time, or the like.

Generally, the data reading from the disk is performed under the standard read conditions set in the disk, head, and HDC.

When an error occurs in a reading according to these predetermined standard conditions, the trackability is intentionally changed or the amplification factor of the automatic gain control (AGC) for signal amplification is maintained, and a rereading is performed. The error recovery by these condition changes is carried out by activating an ERP (Error Recovery Procedure) mode in which a plurality of error recovery steps are sequentially executed.

If the writing is not successful even by the ERP, the error is recognized to be a hard error, and data reassignment is performed to record the particular sector in an alternate sector called a spare sector. Further, also in reading, if the data reading is successful in the predetermined ERP steps, data reassignment is similarly performed by carrying out a writing to move data to the spare sector.

The ERP according to the present invention includes an error recovery step by a low rotational speed reading in which the rotational speed of the motor is decreased, the flying height of the head is decreased, and data is read, in addition to the conventional low rotational speed burnish, low rotational speed sweep, low rotational speed surface analyzing test, high rotational speed reading, and the like.

In the low rotational speed reading step, the flying height of the head is decreased, and data is read while foreign objects on the disk which cause thermal asperity are flicked away.

In accordance with the low rotational speed reading step, the low rotational speed reading can shorten the bit length of read data (the error bit length of data) affected by thermal asperity, which increases the possibility of the recovery by the ECC. The reason for this is described below.

If the rotational speed of the motor is reduced to x times (0<x<1) the normal rotational speed, the relative linear velocity between the head and the disk is also reduced by multiplying by a factor of x. However, since the shapes of thermal asperities are not the same and the position of the colliding thermal asperity depends on the rotational speed of the motor, the collision energy changes. If the energy change due to the rotational speed of the motor is assumed to be $Y(x)$, the energy change produced by the collision of the head with a foreign object on the disk is $Y(x)*x^2$, because it is proportional to the square of the relative velocity and $Y(x)$.

Further, if the relative linear velocity between the head and the disk decreases by a factor of x, the reading bit length per unit time also becomes longer accordingly. If the head bumps against a foreign object, the flying attitude of the head becomes unstable and has an effect on the reading for a time proportional to the above described collision energy, and thus the error bit length of data becomes $Y(x)*x^3$ of the rotational speed of the motor is multiplied by 0.6 (x=0.6), the error bit length of data becomes $Y(0.6)*0.216$ times longer. Although $Y(0.6)$ depends on the nature of thermal asperity, it was experimentally obtained that this is normally two or less, and thus, in this case, the error bit length of data becomes ½ or shorter. The value of x is selected so as to provide an rotational speed which will still cause the head to fly above the disk, and preferably it is 0.4 to 0.7.

Figure 2:
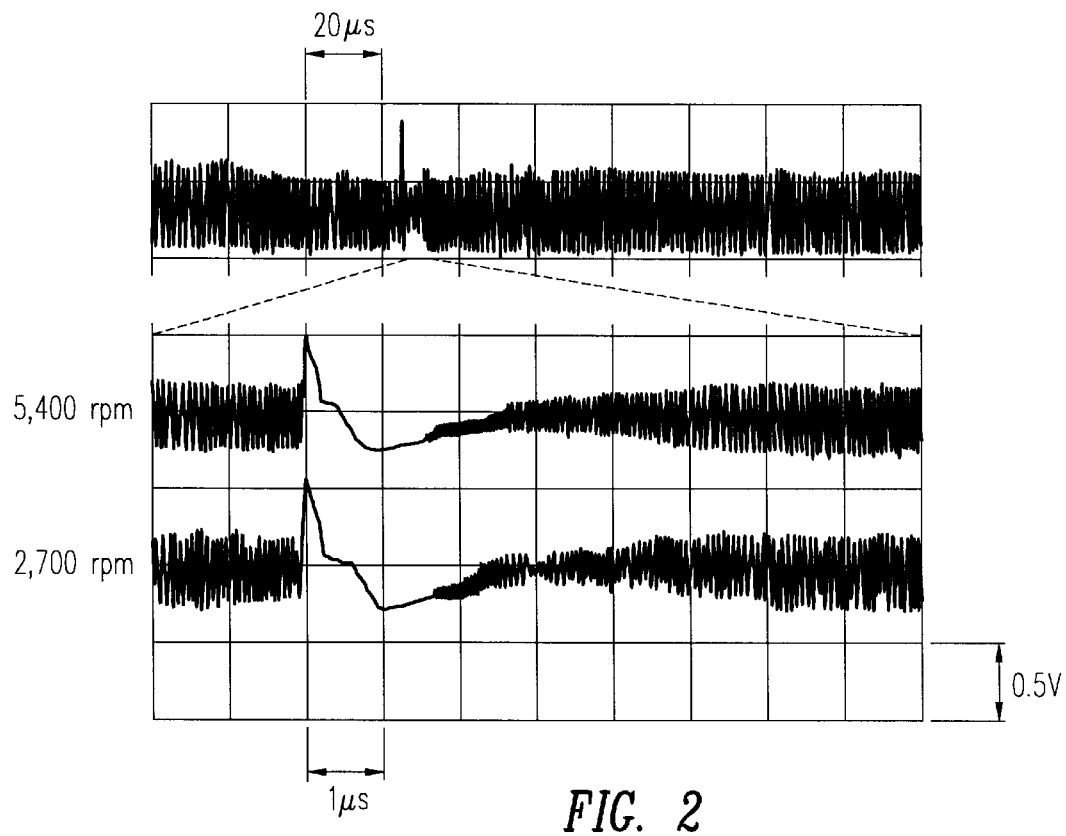
FIG. 2 is a diagram showing the change of the read waveform by thermal asperity when the rotational speed of the motor is decreased.
Figure 3:
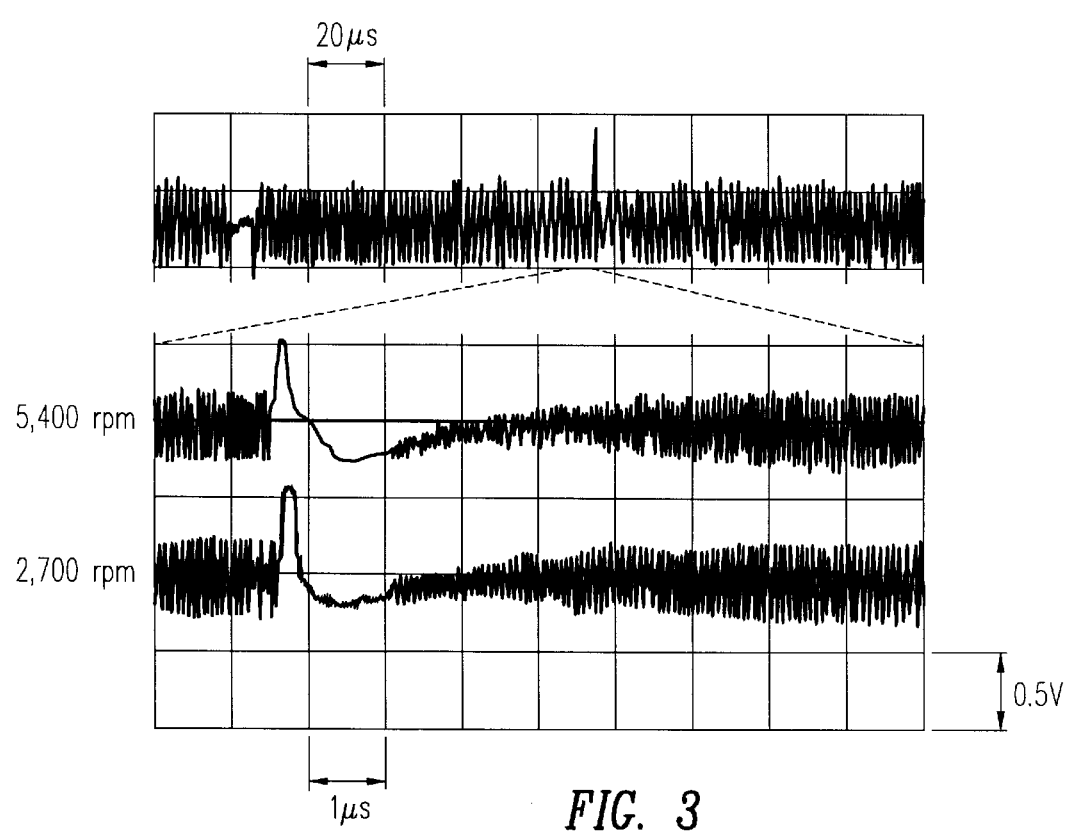
FIG. 3 is a diagram showing the change of the read waveform by thermal asperity when the rotational speed of the motor is decreased.

FIGS. 2 and 3 show an example of the change of the read waveform by thermal asperity when the rotational speed of the motor is decreased. FIG. 2 is for the inner diameter (IS) portion of the disk, and FIG. 3 is for the outer diameter (OD) portion of the disk. In FIGS. 2 and 3, the waveform in the top portion shows the read waveform for the normal rotational speed (5400 rpm), the waveform in the middle portion shows the waveform obtained from a thermal asperity during normal rotation on an expanded time scale, and the waveform in the bottom portion shows the waveform for the low rotational speed (2700 rpm, 0.5 times the normal rotation) of the motor with the time axis being equal to that of the middle portion. These figures show that the time in which the read waveform is affected by thermal asperity is nearly constant regardless of the rotational speed, and hence the lower the rotational speed is, the less the affected bit length is. It is to be noted that, in this embodiment, the value of $Y(x)$ is greater than the typical cases because diamond particles are used as thermal asperities.

Figure 4:
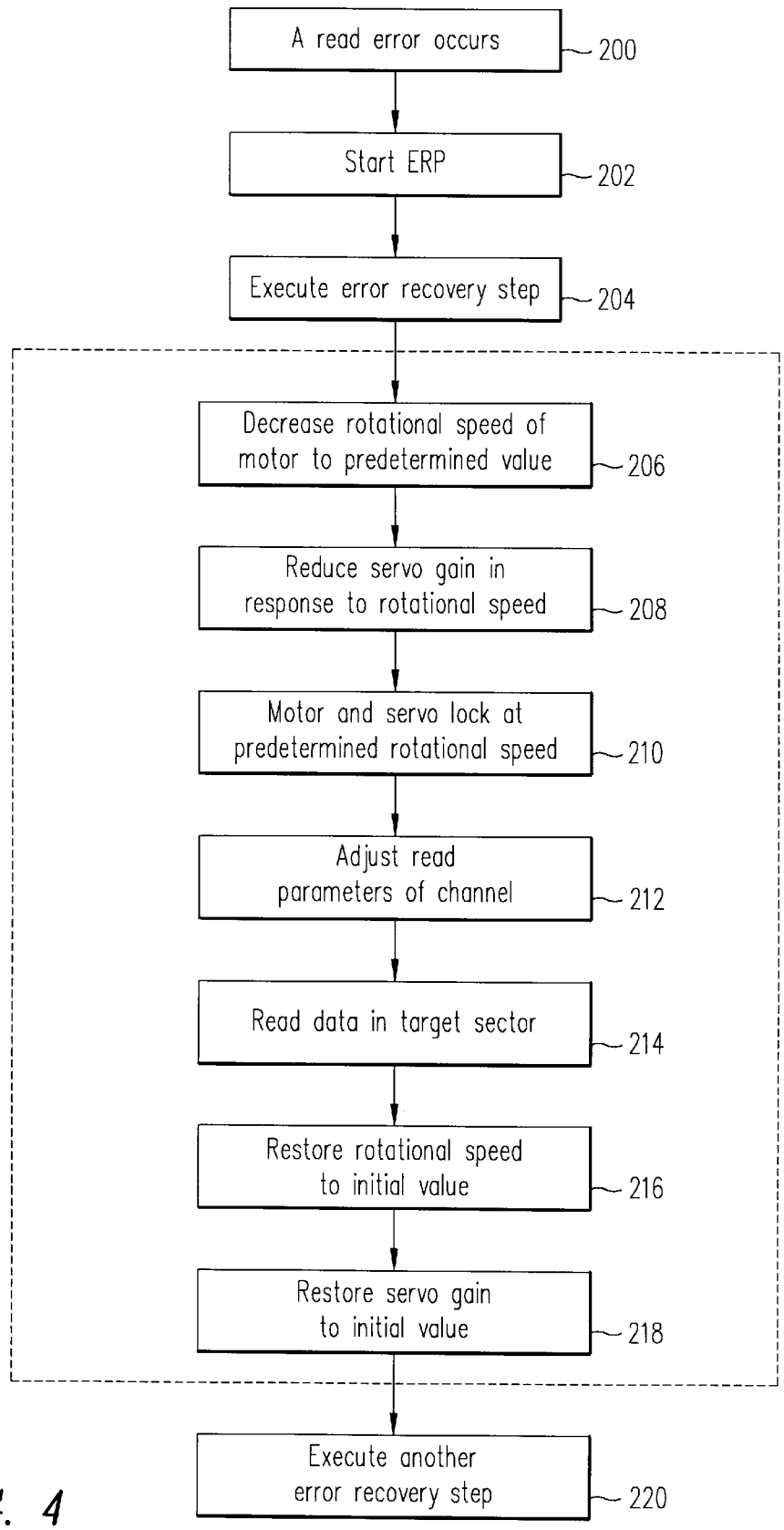
FIG. 4 is a flowchart for the error recovery step by the low rotational speed reading according to present invention.

FIG. 4 shows a flowchart of the error recovery step by the low rotational speed reading according to the present invention. If a read error occurs in a target sector in step 200, the following steps are initiated. The ERP is started in step 202, and an error recovery step such as the low rotational speed burnish is executed. Step 204 may or may not include a plurality of error recovery steps. If the read data in error is not recovered in step 204, the rotational speed of the motor is decreased to a predetermined value in step 206, and the error recovery step by the low rotational speed reading according to the present invention is started. In step 208, the servo gain is reduced to an appropriate value in response to the rotational speed. In step 210, the motor and servo are locked at a predetermined rotational speed. In step 212, the reading parameters of the channel such as frequency are adjusted according to the rotational speed. In step 214, the data in the target sector is read. In step 216, the rotational speed is restored to the initial value. In step 218, the servo gain is restored to the initial value, and the error recovery step by the low rotational speed reading is terminated. If the error is not recovered by the error recovery step by the low rotational speed reading, another error recovery step is executed in step 220. Step 220 may or may not include a plurality or error recovery steps.

These steps may be stored as a microcode program in a memory such as the ROM in the HDC, but all or part of these steps may be stored in the disk. In this case, they are read out from the disk when the hard disk drive is started up, and stored in a memory such as a RAM for execution.

In accordance with the present invention, the bit length affected by thermal asperity is reduced, and the possibility of correcting a read error by the error correction code (ECC) is increased.

Furthermore, in accordance with the present invention, an error recovery method and apparatus effective for recovering from a read error such as those due to thermal asperity can be provided, and the occurrence of hard errors can be reduced.

What is claimed is:

1. An error recovery method in a disk storage device in which normal read operations are performed at a first rotational speed of a motor comprising steps of:

decreasing rotational speed of the motor from the first rotational speed to a second rotational speed which is not less than 0.4 times said first rotational speed; and performing a low rotational speed read operation for re-reading user data in a target sector on a disk at the second rotational speed.

2. An error recovery method as set forth in claim 1 wherein said second rotational speed is 0.4 to 0.7 times said first rotational speed.

3. An error recovery method as set forth in claim 1 further comprising the step of decreasing a frequency used to read data from a first frequency at the first rotational speed to a second frequency corresponding to the second rotational speed.

4. An error recovery method as set forth in claim 3 wherein the second frequency is 0.4 to 0.7 times the first frequency.

5. An error recovery method as set forth in claim 1 further comprising the step of decreasing a servo gain to correspond to the second rotational speed prior to the performing step.

6. An error recovery method as set forth in claim 1 further comprising the step of adjusting read parameters of a channel to correspond to the second rotational steed prior to the performing step.

7. An error recovery method as set forth in claim 1 further comprising the step of increasing the rotational speed of the motor to the first rotational speed.

8. An error recovery method as set forth in claim 1 wherein said second rotational speed is 0.4 to 0.7 times said first rotational speed, further comprising the steps of:

decreasing a servo gain and setting the read parameters of a channel to correspond to the second speed prior to the performing step; and increasing the rotational speed of the motor to the first rotational speed after the performing operation has completed.

9. A disk storage device comprising:

a recording disk;

a head for reading user data from the recording disk;

a motor for rotating the disk at first and second rotational speeds with the second rotational speed being less than the first rotational speed;

a hard disk controller with an error recovery mode for data in failed read operations which decreases a rotational speed of the motor to the second rotational speed which is no less than 0.4 times the first rotational speed, and then rereads the user data at the second rotational speed.

10. A disk storage device as set forth in claim 9 wherein the second rotational speed is 0.4 to 0.7 times the first rotational speed.

11. A disk storage device as set forth in claim 9 wherein the hard disk controller decreases a frequency used to read data from a first frequency used for the first rotational speed to a second frequency corresponding to the second rotational speed before rereading the data.

12. A disk storage device as set forth in claim 11 wherein the second frequency is 0.4 to 0.7 times the first frequency.

13. A disk storage device as set forth in claim 9 wherein the hard disk controller decreases a servo gain to correspond to the second rotational speed prior to rereading the data.

14. A disk storage device as set forth in claim 9 wherein the hard disk controller increases the rotational speed of the motor to the first rotational speed after rereading the data.

15. A disk storage device as set forth in claim 9 wherein the second rotational speed is 0.4 to 0.7 times the first rotational speed; and the hard disk controller decreases a servo gain to correspond to the second rotational speed prior to rereading the data and increases the rotational speed of the motor to the first rotational speed after rereading the data.

16. A disk storage device as set forth in claim 9 further comprising a channel with adjustable parameters for reading operations and wherein the hard disk controller sets the adjustable parameters to a first set of values for normal read operations at the first rotational speed and sets the adjustable parameters to second set of values corresponding to the second rotational speed.

17. A disk storage device comprising:

a disk;

a head for reading user data recorded on the disk;

a motor for rotating the disk at first and second speeds;

a channel for controlling read signals from the head, the channel having adjustable read parameters;

means for detecting an error in user data read from the disk rotating at the first speed;

means responsive to the means for detecting for reducing the speed of the motor to the second speed with the second speed being less than the first speed and sufficient to cause the head to fly above the disk;

means responsive to the means for detecting for changing the channel read parameters from a first set of parameters to a second set of parameters, the first set of parameters corresponding to the first speed and the second set of parameters corresponding to the second speed; and means responsive to the means for detecting for rereading the user data at the second speed using the second set of parameters.

18. The disk storage device of claim 17 further comprising a servo system for positioning the head over the disk, the servo system having an adjustable gain and means responsive to the means for detecting for reducing the gain of the servo system to correspond to the second speed.

19. The disk storage device of claim 17 further comprising means for increasing the speed of the motor to the first speed and changing the channel read parameters to the first set of parameters after the means for rereading has retrieved the data.

20. A disk storage device of claim 17 wherein the second speed is 0.4 to 0.7 times the first speed.

* * * * *